United States Patent [19]

Bessler et al.

[11] Patent Number: 5,561,602
[45] Date of Patent: Oct. 1, 1996

[54] TUNNEL OPERATION FOR SELF-PROPELLED TRACTION VEHICLES

[75] Inventors: Warren F. Bessler, Schenectady, N.Y.; Ronald F. Griebel; Gregory A. Marsh, both of Erie, Pa.

[73] Assignee: General Electric Company, Schenectady, N.Y.

[21] Appl. No.: 272,974

[22] Filed: Jul. 1, 1994

[51] Int. Cl.$^6$ ................................................ G06F 19/00
[52] U.S. Cl. .................... 364/424.01; 454/70; 123/41.13
[58] Field of Search .................... 105/49, 59; 104/138.1; 246/62, 167 R, 177, 178; 364/424.01, 426.05, 444, 449; 123/41.01, 41.13, 41.31, 41.15

[56] References Cited

U.S. PATENT DOCUMENTS

| | | | |
|---|---|---|---|
| 4,698,761 | 10/1987 | Cooper et al. | 364/424.01 |
| 5,070,959 | 12/1991 | Grabowski | 180/167 |
| 5,245,495 | 9/1993 | Bailey et al. | 361/23 |
| 5,253,613 | 10/1993 | Bailey et al. | 123/41.31 |
| 5,298,842 | 3/1994 | Vanek et al. | 318/473 |
| 5,392,741 | 2/1995 | Uzkan | 123/41.13 |
| 5,428,545 | 6/1995 | Maegawa et al. | 364/444 |
| 5,439,415 | 8/1995 | Hirikawa et al. | 454/70 |

*Primary Examiner*—Gary Chin
*Attorney, Agent, or Firm*—Patrick K. Patnode; Donald S. Ingraham; Marvin Snyder

[57] ABSTRACT

In a tunnel control system for traction vehicles, the normal deration function is suppressed to delay deration in a tunnel. The traction vehicle is provided with a controller having a normal operation mode and a tunnel operation mode. A tunnel indicator connected to the controller provides an indication of when the vehicle is approaching a tunnel and causes the controller to switch into the tunnel operation mode. In this mode, the controller increases cooling to reduce the temperature of the vehicle's prime mover and the control electronics prior to entering the tunnel. As the traction vehicle enters the tunnel, the controller monitors the engine oil temperature and the ambient air temperature. If the ambient air temperature exceeds a predetermined value, then the cooling of the control electronics is discontinued. If the oil temperature exceeds a threshold (which is about 10° C. higher than the normal deration threshold), then power to the prime mover is derated. After the vehicle exits the tunnel, the prime mover and control electronics are gradually cooled to avoid thermal shock.

18 Claims, 3 Drawing Sheets

TUNNEL OPERATION FOR SELF-PROPELLED TRACTION VEHICLES

BACKGROUND OF THE INVENTION

This invention relates generally to traction vehicles such as locomotives that have thermal prime movers on board and more particularly to operating locomotives inside of tunnels.

Large self-propelled traction vehicles such as locomotives commonly use a thermal prime mover to drive a generator. The generator supplies electric current to a plurality of direct current (dc) traction motors whose rotors are drivingly coupled to respective axle-wheel sets of the vehicle. The generator typically comprises a main 3-phase traction alternator whose rotor is mechanically coupled to the output shaft of the prime mover (typically a 16-cylinder turbocharged diesel engine). When excitation current is supplied to field windings on the rotating rotor, alternating voltages are generated in the 3-phase stator windings of the alternator. These voltages are rectified and applied to the armature windings of the traction motors. Alternatively, alternating current (ac) traction motors could be used, in which case suitably controlled electric power inverters would be connected between the respective motors and the alternator.

During its normal propulsion mode of operation, a locomotive diesel engine tends to deliver constant power, depending on throttle setting and ambient conditions, regardless of locomotive speed. For maximum performance, the electrical power output of the alternator must be suitably controlled so that the locomotive utilizes full engine power. However, the load on the engine must not exceed whatever level of power the engine can develop. Overloads can cause premature wear, engine stalling, or other undesirable effects. Historically, locomotive control systems have been designed so that the operator can select the desired level of traction power in discrete steps between zero and maximum, and so that the engine develops whatever level of power the traction and any auxiliary loads demand.

Locomotive control systems also typically include suitable means for overriding normal propulsion operation in response to certain abnormal conditions. The response to such abnormal conditions is to reduce or "derate" engine load. This helps the locomotive recover from the abnormal condition and/or prevents serious damage to the engine. One condition which requires derating locomotive power output is excessive engine heat. Typically, the temperature of the engine cooling system is monitored to determine whether the engine load needs to be derated because of overheating. Under this system, unusually high ambient air temperature can cause deration even though there is no malfunction of the engine or its cooling system. This is particularly a problem for multiple-locomotive trains operating within long, narrow tunnels where the trailing units are exposed to high ambient temperatures produced by the exhaust of the leading units. The high ambient temperatures, which can approach 150° C., cause the trailing units to overheat. The resulting deration of the overheated locomotives in a tunnel will adversely affect performance, thereby undesirably increasing running time and decreasing productivity.

Locomotive deration in response to temporary overheating caused by tunnel operation is not really necessary as long as the engine and its various support systems are functioning properly and as long as the locomotive is not inside the tunnel too long. Locomotive components ordinarily have short-time ratings that appreciably exceed their ratings for continuous duty, and therefore a locomotive can safely endure overheating caused by a tunnel environment for short periods (e.g., under approximately ten minutes). Accordingly, when a locomotive engine is temporarily overheated because the locomotive is passing through a tunnel, it is both desirable and feasible to cancel or delay the normal temperature-responsive deration that is provided in prior art locomotive propulsion systems.

U.S. Pat. No. 4,698,761, issued Oct. 6, 1987 to Charles E. Cooper et al., describes a system for a diesel-electric locomotive which automatically detects when the locomotive is in a tunnel. The system monitors the temperatures of the cooling system and the engine lubricant and indicates that the locomotive is in a tunnel if the coolant temperature exceeds an abnormally high magnitude and is higher than a variable reference level that depends on the lubricant temperature. When a tunnel is thus detected, the normal deration function is temporarily suppressed to delay deration. The system shifts the over temperature threshold to a second level which is higher than the level at which deration is normally initiated. Consequently, the engine is allowed to reach a higher temperature before locomotive power is derated while the locomotive is temporarily inside a tunnel. While this system is effective, it only reacts to the high tunnel temperatures after the locomotive or locomotives are already in a tunnel.

Accordingly, there is a need for a locomotive control scheme which can anticipate an approaching tunnel to maximize the time in the tunnel without overheating, thereby avoiding unnecessary tunnel derating.

SUMMARY OF THE INVENTION

The above-mentioned needs are met by the present invention which provides a tunnel mode of operation for traction vehicles. The traction vehicle is provided with a controller having a normal operation mode and a tunnel operation mode and a tunnel indicator connected to the controller. The tunnel indicator signals the controller when a tunnel is approaching, causing the controller to switch into the tunnel operation mode. The tunnel indicator can comprise either a manually-operated switch, a system comprising a transceiver located on the traction vehicle and a wayside transponder located at a desired distance from a tunnel or a Global Positioning System (GPS) receiver. The tunnel indication is preferably provided when the traction vehicle is about 1–2 miles from a tunnel.

Once the tunnel operation mode is initiated, the controller reduces the temperature of the vehicle's prime mover and the control electronics by increasing the speed of the cooling fans. As the traction vehicle enters the tunnel, the controller monitors the engine oil temperature and the ambient air temperature. If the ambient air temperature exceeds a predetermined value, then the cooling of the control electronics is discontinued, and if the oil temperature exceeds another predetermined value, then power to the prime mover is derated. The temperature level at which power is derated is approximately 10° C. higher than the threshold at which power is normally derated when the traction vehicle is not in a tunnel. Lastly, the controller causes gradual cooling of the prime mover and the control electronics after the traction vehicle exits a tunnel.

Other objects and advantages of the present invention will become apparent upon reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
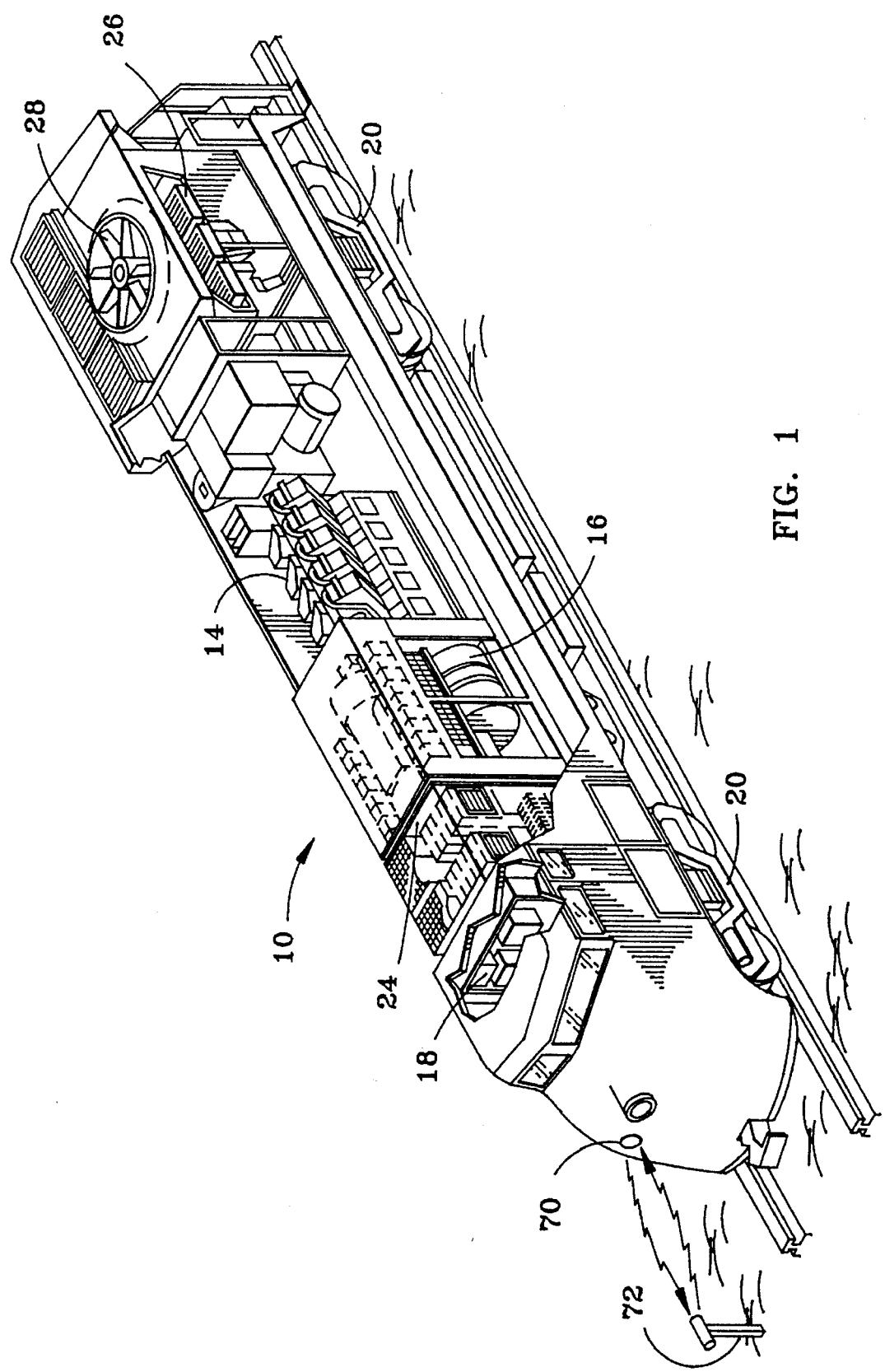
FIG. 1 is a simplified, partially cutaway view of a traction vehicle in accordance with the present invention.

Referring to the drawings wherein identical reference numerals denote the same elements throughout the various views, FIG. 1 shows a simplified, partially cut-away view of a traction vehicle such as a locomotive 10 which incorporates the tunnel operation mode of the present invention. Generally, the locomotive 10 includes a variable-speed prime mover 14 such as a diesel engine mechanically coupled to the rotor of a dynamoelectric machine 16. The dynamoelectric machine 16 is typically a three-phase ac synchronous generator referred to herein as the main traction alternator. The main traction alternator 16 has a field excitation controlled by an on-board controller 18 to maintain a constant horsepower load on the prime mover 14 when the locomotive 10 is operating within its normal continuous rating performance envelope. Traction motors (not shown in FIG. 1) are mounted on the axles of two locomotive trucks 20. Preferably, there are two or more axles per truck with at least one traction motor per axle.

Regulating the alternator field excitation varies the tractive effort delivered by traction motors. Power output of the main traction alternator 16 is regulated in a well known manner by the controller 18 and additional control electronics as described below. The controller 18 and other electronic components are packaged in a conventional manner and 2Located in an equipment compartment 24. A number of blowers (not shown in FIG. 1) are located in the compartment 24 and draw air from above the locomotive 10 into the compartment 24 for forced air cooling of selected electronic equipment. The locomotive 10 also includes radiators 26 and a radiator fan 28 as part of an engine cooling system for cooling the prime mover 14.

Figure 2:
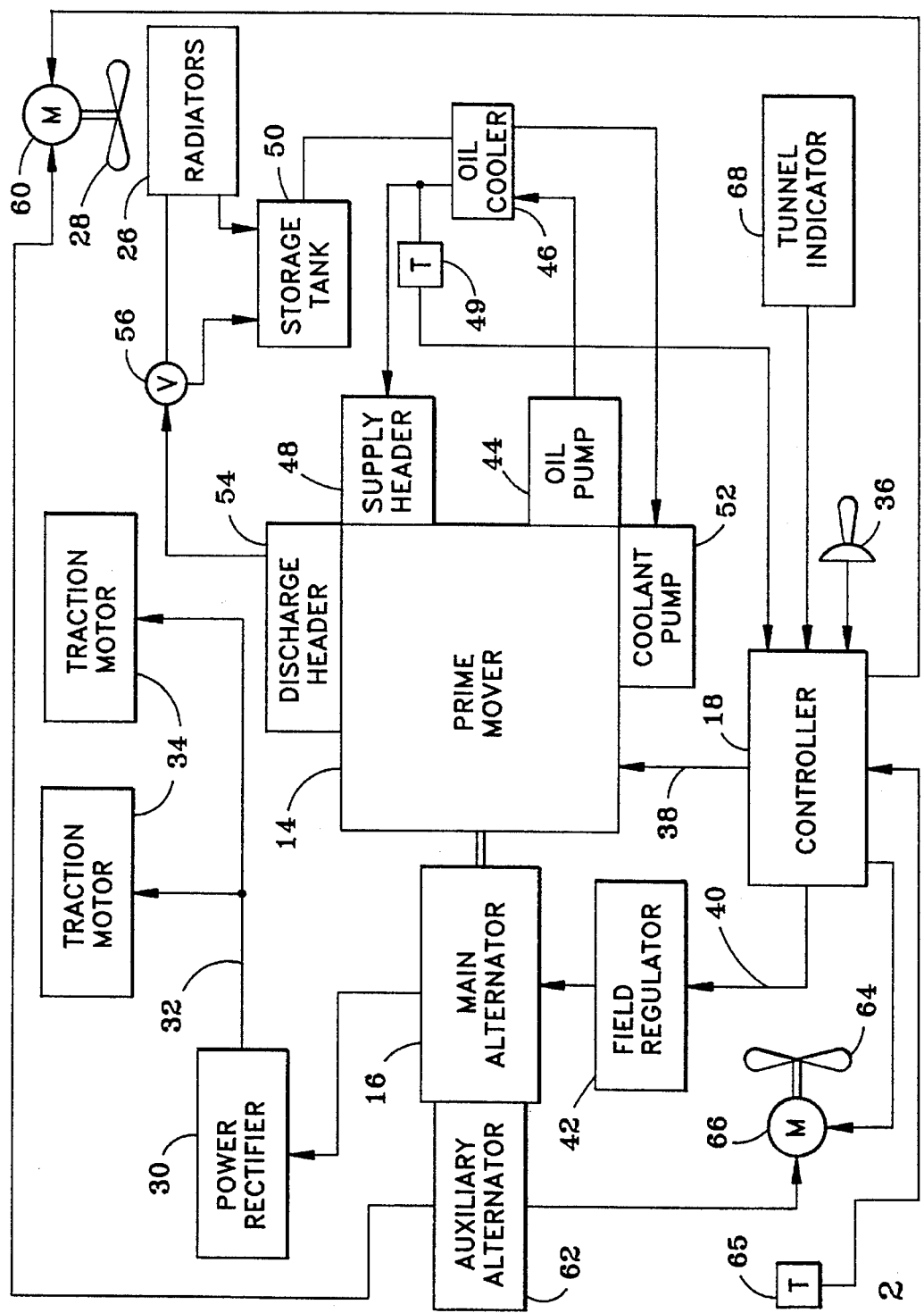
FIG. 2 is a simplified block diagram of the present invention.

FIG. 2 is a simplified block diagram showing some of the principal components of the locomotive 10, including the prime mover 14 and the main traction alternator 16. The 3-phase voltages generated by the main traction alternator 16 are applied to ac input terminals of at least one 3-phase, double-way uncontrolled power rectifier bridge 30. The rectified electric power output of the bridge 30 is supplied, via a dc bus 32, to parallel-connected armature windings of a plurality of traction motors 34. As shown in FIG. 2, the traction motors 34 are dc motors; alternatively, ac traction motors could be used, in which case suitably controlled electric power inverters would be connected between the respective motors and the dc bus 32. Although only two traction motors 34 are shown in FIG. 2, this is only for purposes of illustration. As mentioned above, a traction motor 34 is typically mounted on each axle of each locomotive truck 20.

In the normal propulsion mode of operation, the speed of the locomotive 10 is determined by the position of a manually operated throttle 36 which is coupled the controller 18. A locomotive throttle conventionally has eight power positions (ranging from minimum to maximum power), plus idle and shutdown. The controller 18 produces two control signals, the speed command signal 38 and the regulator signal 40, having magnitudes that normally depend on the throttle position selected by the locomotive operator. The speed command signal 38 controls the desired speed of the prime mover 14 via a speed governor (not shown). The regulator signal 40 is fed to a conventional field regulator 42 such as a 3-phase controlled rectifier bridge. In response, the field regulator 42 outputs an appropriately regulated excitation current which is supplied to the field windings (not shown) on the rotor of the main traction alternator 16 for energization thereof. In this manner, the traction power is regulated to match the called-for power so long as the alternator output voltage and load current are both within predetermined limits.

The prime mover 14 is a thermal or internal-combustion engine or equivalent. One preferred engine is a high-horsepower, turbocharged, 4-stroke, 16-cylinder diesel engine. Such an engine has a number of support systems including a lube oil system and a engine cooling system. The lube oil system comprises an oil pump 44, an oil cooler 46, and an oil supply header 48 wherein hot engine lubricating oil from the crank case near the bottom of the engine 14 is pumped by the engine-driven pump 44 to the oil cooler 46, and cooled oil flows from the oil cooler 46 through an oil filter (not shown) to the oil supply header 48. The temperature of the oil exiting the oil cooler 46 is monitored by an oil temperature sensor 49 which sends a signal representing the oil temperature to the controller 18. From the supply header 48, the oil is distributed to various bearings, valves, pistons, gears, and other moving parts of the engine for lubricating and/or cooling purposes.

The engine cooling system includes a storage tank 50 which holds a relatively cool coolant such as water. Coolant from the storage tank 50 flows, via the oil cooler 46 where it cools the lube oil, to the suction side of an engine-driven pump 52. The pump 52 causes the coolant to flow through the cylinder liners of the engine 14 and absorb heat rejected during the combustion process. Hot water exits the engine 14 via a discharge header 54 and flows to a bypass valve 56. The valve 56 is preferably thermostatically controlled and has two outlet ports. Whenever the temperature of the coolant entering the valve 56 is lower than a predetermined threshold, the valve 56 diverts the coolant directly to the storage tank. 50. Otherwise, the coolant is sent to the radiators 26 which comprise coolant-air heat exchangers.

Cooling air is blown through the radiators 26 by the fan 28 which is driven by a variable speed motor 60. The motor 60 is energized by the output of an engine-driven auxiliary alternator 62. The auxiliary alternator 62 can actually comprise an auxiliary set of 3-phase windings on the same frame as the main traction alternator 16. The speed of the variable speed motor 60 is controlled by the controller 18 so as to control the amount of cooling in the radiators 26. For instance, if more cooling is required, then the speed of the motor 60 will be increased. It should be noted that more than one radiator fan and motor may be employed. After being cooled in the radiators 26, the coolant is returned to the storage tank 50. The radiators 26 are disposed at a higher elevation than the storage tank 50 so that coolant will quickly and completely drain to the tank 50.

As described above, the controller 18 and other control electronics, such as the rectifier bridge 30 and the field regulator 42, are cooled by a number of blowers 64 (only one shown in FIG. 2). The blowers 64 draw ambient air from above the locomotive 10 and blow the air over the electronic components for forced air cooling thereof. An ambient temperature sensor 65 is located near the locomotive's air intake to sense the ambient air temperature. A signal of this temperature is fed to the controller 18. The blowers 64 are driven by variable speed motors 66. Like the radiator fan motor 60 described above, the blower motors 66 are energized by the auxiliary alternator 62, and their speed is controlled by the controller 18 so as to control the cooling of the electronic components.

The locomotive 10 also includes a tunnel indicator 68 which provides a signal to the controller 18 to indicate that the locomotive 10 is approaching a tunnel. In one embodiment, the tunnel indicator 68 can comprise a switch which the locomotive operator would manually activate at an assigned milepost before the tunnel, thereby providing an approaching tunnel signal to the controller 18. In another embodiment, the tunnel indicator 68 can comprise a transponder system for automatically signaling an approaching tunnel. Such a system, which is generally known in the art, includes transmitting-receiving means 70 (FIG. 1) referred to herein as a "transceiver" located on the locomotive 10 and a wayside transponder 72 placed at a desired distance before the tunnel. In response to activating signals from the transceiver 70 of an approaching locomotive 10, the transponder 72 will transmit a signal back to the transceiver 70 indicating an approaching tunnel. The transmitted signal can also be encoded to include information such as the distance to the tunnel and the length of the tunnel. The information received by the transceiver 70 is fed to the controller 18.

In yet another embodiment, the tunnel indicator 68 can comprise a Global Positioning System (GPS) receiver located on the locomotive. The GPS is a position measuring system comprising 16–24 artificial satellites in a constellation that beams highly accurate timed signals to earth. GPS receivers process these signals and provide accurate position information. In take present invention, the GPS receiver feeds a position signal to the controller 18. This position signal will thus be an indication of when the locomotive 10 is approaching a tunnel.

Figure 3:
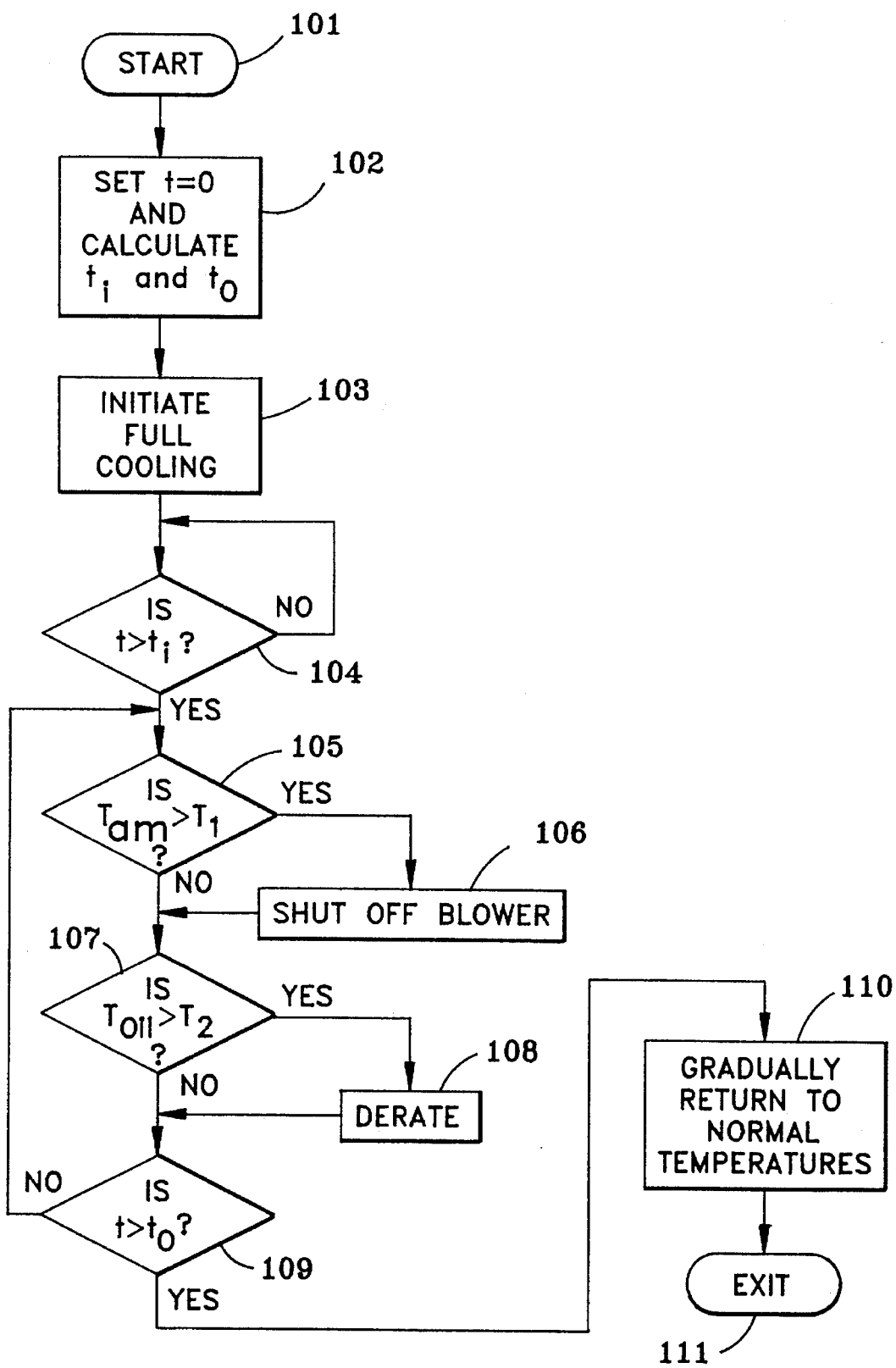
FIG. 3 is a flow diagram which illustrates the tunnel operation mode of the present invention.

In one preferred embodiment, the controller 18 comprises a conventional microcomputer which is programmed for the normal propulsion mode described above. In accordance with the present invention, the controller 18 is also programmed for a tunnel operation mode which is illustrated in the flow diagram of FIG. 3. The controller 18 switches to the tunnel operation mode when the tunnel indicator 68 is triggered (either manually or automatically) as indicated at block 101. For normal conditions, the tunnel indicator is preferably triggered when the locomotive is 1–2 miles from the tunnel. Once the tunnel operation mode is initiated, the controller 18 resets and :starts an internal timer and calculates an estimated time to enter the tunnel, $t_i$, and an estimated time to exit the tunnel, $t_o$, as indicated at block 102. The times ti and to are based on the track speed of the locomotive 10 which is conventionally monitored by the controller 18, the distance to the tunnel, and the length of the tunnel. In the case of a manual tunnel indication, the two distances are stored in the controller 18. The distance to the tunnel would depend on the switch being triggered at the correct milepost, and the length of the tunnel could be based on the longest tunnel the locomotive 10 is likely to traverse. With a transponder, the distance information would be encoded into the transmitted signal. If using the GPS receiver, the distance information would be calculated from the position signal produced by the GPS receiver.

The controller 18 then initiates full cooling as indicated at block 103. Specifically, the controller 18 causes the blower motors 66 to run at full speed to maximize cooling of the electronics prior to entering the tunnel. The controller 18 also runs the motor 60 at full (or at least a higher) speed so that the radiator fan 28 produces increased cooling in the radiators 26. The speed of the fan 28, and hence the amount of increased cooling, is based on the tunnel entrance time ti and the ambient air temperature which is measured by the ambient temperature sensor 65. The controller 18 sets the speed of the fan 28 so as to get as close as possible to a minimum system temperature in the time before reaching the tunnel. A lower limit for the oil temperature is set because if the oil becomes too cool, the effectiveness of the locomotive 10 will be hampered. The resulting lower system temperatures in effect increase the tolerance of the locomotive 10 to thermal overload, thereby maximizing the time the locomotive 10 can spend in the tunnel before critical temperatures are reached.

At block 104, the controller 18 waits until the time $t_i$ is reached before proceeding. Once $t_i$ is reached, and the locomotive 10 is in the tunnel, the controller 18 begins monitoring system temperatures as follows. If the ambient temperature, $T_{amb}$, at the inlet of the blowers 64 (as measured by the ambient temperature sensor 65) is determined at block 105 not to exceed a predetermined value, $T_1$, then blower operation is continued. But if the ambient temperature does exceed the predetermined value, $T_1$, then the controller 18 shuts off the blowers 64 as indicated at block 106, and the thermal inertia of the electronics will be relied on to prevent overheating until the locomotive 10 passes out of the tunnel. A temperature of about 100° C. has been determined to be good for the predetermined value, $T_i$, at which the blower is to be shut off.

Next, at block 107, the controller 18 determines whether the oil temperature, $T_{oil}$, measured by the temperature sensor 49 exceeds a temperature threshold, $T_2$. If $T_2$ is not exceeded, then the prime mover 14 is allowed to operate at the same level. If $T_2$ is exceeded, then critical temperatures have been reached and the prime mover 14 is derated as indicated at block 108. The deration function of block 108 utilizes a temperature threshold, $T_2$, of approximately 95° C. which is about 10° C. higher than the threshold used for normal, nontunnel deration. Initially, locomotive power will be derated by some predetermined amount, say 10%. If the oil temperature continues to increase, the deration function of block 108 proceeds through a series of increasingly effective deration steps.

In practice, there can be one deration step for each degree of temperature increment, and each step can reduce the locomotive power an additional 10%. Full deration (zero traction power) would thus be obtained if the oil temperature exceeds $T_2$ by 10° C. Because the temperature threshold at which deration is initiated is higher for the tunnel operation mode, the locomotive 10 is allowed to run longer with full traction power, thereby improving its performance. Even one extra minute of full power is beneficial. The higher system temperatures that may consequently develop are within the short time ratings of the components and can be safely tolerated so long as the locomotive 10 is not in the tunnel too long.

The process of monitoring system temperatures is continued until the time to has been reached as indicated at block 109. At this time, the locomotive 10 should be out of the tunnel. When it is determined at block 109 that the locomotive is out of the tunnel, then the system temperatures are gradually returned to normal levels at block 110 so as not to thermally shock the prime mover 14. The controller 18 produces this gradual cooling by initially running the radiator fan 28 and the blowers 64 at less than normal speeds and then slowly ramping motor speed up to normal levels. Once, normal temperatures have been achieved again, the controller 18 exits the tunnel operation mode at block 111 and returns to the normal propulsion mode.

The foregoing has described a tunnel operation mode for traction vehicles such as locomotives. The control scheme maximizes the time a locomotive can operate within a tunnel without overheating, thereby avoiding unnecessary tunnel derating. While specific embodiments of the present invention have been described, it will be apparent to those skilled in the art that various modifications thereto can be made without departing from the spirit and scope of the invention as defined in the appended claims.

What is claimed is:

1. A tunnel control method for a traction vehicle having a prime mover and control electronics, said method comprising the steps of:

providing a tunnel indication whenever said traction vehicle is approaching a tunnel;

reducing the temperature of said prime mover and said control electronics in response to said tunnel indication;

sensing oil temperature in said prime mover and ambient air temperature;

discontinuing cooling of said control electronics if said ambient air temperature exceeds a predetermined value; and derating power to said prime mover if said oil temperature exceeds a temperature threshold.

2. The method of claim 1 wherein said step of providing a tunnel indication whenever said traction vehicle is approaching a tunnel comprises providing said tunnel indication when said traction vehicle is about 1–2 miles from a tunnel.

3. The method of claim 1 wherein said step of sensing oil temperature in said prime mover and ambient air temperature is initiated when said traction vehicle enters a tunnel.

4. The method of claim 1 further comprising the step of gradually cooling said prime mover and said control electronics after said traction vehicle exits a tunnel.

5. The method of claim 1 wherein said predetermined value is approximately 100° C.

6. The method of claim 1 wherein said temperature threshold is approximately 10° C. higher than a temperature threshold at which power to said prime mover is derated when said traction vehicle is not in a tunnel.

7. The method of claim 1 wherein said temperature threshold is approximately 95° C.

8. A traction vehicle comprising:

train control electronics comprising a controller, and a tunnel indicator coupled to said controller, said tunnel indicator being adapted to generate a tunnel approach signal corresponding to the approach of said traction vehicle to a tunnel prior to entering therein; and said traction vehicle further comprising at least one blower motor coupled to said controller wherein said controller causes said blower motor to run at an increased speed to increase air flow to cool said electronics in correspondence with the tunnel approach signal.

9. A traction vehicle in accordance with claim 8, further comprising a radiator fan coupled to said controller and wherein said controller generates a signal to control the speed of said fan for increasing cooling airflow in correspondence with the tunnel approach signal.

10. A traction vehicle in accordance with claim 9, wherein said controller is further adapted to control the speed of said fan in correspondence with a tunnel entrance time and an ambient air temperature.

11. A traction vehicle in accordance with claim 8, wherein said tunnel indicator comprises a switch which is manually activated to generate said tunnel approach signal.

12. A traction vehicle in accordance with claim 8, wherein said tunnel indicator comprises a transponder system to generate said tunnel approach signal, said transponder system including a transceiver, located on said traction vehicle, said transceiver coupled to said controller, and a wayside transponder located at a desired distance from the tunnel.

13. A traction vehicle in accordance with claim 8, wherein said tunnel indicator comprises a Global Positioning System receiver coupled to said controller for generating said tunnel approach signal.

14. A traction vehicle in accordance with claim 8, wherein said controller is adapted to calculate an estimated time to enter the tunnel and an estimated time to exit the tunnel based on current track speed of the traction vehicle, distance of the traction vehicle to the tunnel, and length of the approaching tunnel.

15. A traction vehicle in accordance with claim 8, further comprising an ambient temperature sensor coupled to said controller, said temperature sensor positioned proximate an air intake of said traction vehicle to sense ambient air temperature.

16. A traction vehicle in accordance with claim 15, wherein said controller is adapted to generate a signal to shut off said blower if the ambient air temperature sensed by said ambient temperature sensor exceeds a predetermined temperature.

17. A traction vehicle in accordance with claim 8, further comprising a temperature sensor coupled to said controller, said temperature sensor proximate an oil cooler to sense oil temperature.

18. A traction vehicle in accordance with claim 17, further comprising a prime mover coupled to said controller, wherein said controller is adapted to generate a signal to derate power to said prime mover if the oil temperature sensed by said temperature sensor exceeds a predetermined temperature.

* * * * *